United States Patent Office 2,879,249
Patented Mar. 24, 1959

2,879,249

HARDENABLE MIXTURES OF UNSATURATED POLYESTERS AND POLYMERIZABLE ETHYLENE DERIVATIVES AND PROCESS OF MAKING

Karl Raichle, Hans Schweeberg, and Hermann Schnell, Krefeld-Uerdingen, Germany, assignors to Farbenfabriken Bayer Aktiengesellschaft, Leverkusen, Germany, a corporation of Germany No Drawing. Application December 23, 1955
Serial No. 555,185

Claims priority, application Germany December 27, 1954

11 Claims. (Cl. 260—45.4)

The known copolymerization of unsaturated polyesters with polymerizable ethylene derivatives is applied in various ways for producing hardened insoluble plastics. The unsaturated polyesters are preferably prepared from α,β-unsaturated dicarboxylic acids such as fumaric acid or maleic acid, and chiefly dihydric alcohols such as ethylene glycol, diethylene glycol, 1,2-propanediol, 1,3-butanediol or 1,4-butanediol in general in admixture with saturated dicarboxylic acids such as succinic acid, adipic acid, phthalic acid and terephthalic acid. The mixtures of these unsaturated polyesters with polymerizable ethylene derivatives such as styrene, divinylbenzene, acrylic or methacrylic acid derivatives and esters of vinyl alcohol or allyl alcohol, are hardened either with the addition of catalysts promoting polymerization, for example, organic peroxides at elevated temperature or, if desired, at room temperature, after a further addition of accelerators such as metal salts, preferably cobalt salts soluble in organic solvents, or of tertiary amines.

Whilst the working up of copolymerizing mixtures in closed moulds leads to hardened products of satisfactory surface, the known polymerization-inhibiting action of oxygen detrimentally affects the hardening of the mixtures in open moulds and particularly their use as lacquers. The hardening is restricted to the lower layers, whilst the surfaces in contact with air are left more or less tacky and soft. This disadvantage becomes more manifest the lower the hardening temperature is chosen, and therefore special difficulty is encountered whenever heat sensitive substances such as wood are to be coated with the hardenable mixtures.

In order to obtain dry surfaces, the tacky layer may be removed by washing off with solvents. It has also been proposed to produce tack-free surfaces by adding to the hardenable mixtures substances which form during the hardening an air-impermeable film on the surface such as waxes or paraffine. These additives however reduce the adhesiveness of the coats on the substrate. Another disadvantage which is due to the unsatisfactory condition of the surface of the lacquer film produced from hardenable mixtures of the aforesaid kind consists in that after-treatment by polishing is practically impossible. The polishing papers become very rapidly useless on the one hand and dirty surfaces are produced on the other hand.

It has now been found that it is possible to produce even at room temperature or at only moderately elevated temperature mixtures of the aforesaid kind which readily harden in the air also on the surface, by starting from unsaturated polyesters which contain as alcohol component residues of (4,4'-dihydroxy-dicyclohexyl)-alkanes of the general formula:

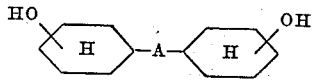

wherein A denotes an alkylene group.

These diols are obtained, for example, by hydrogenation of the nucleus of the corresponding bis-phenols. The diols preferred according to the invention are those which derive from bis-phenols obtained by condensation of monohydric phenols with aldehydes or ketones and are therefore technically particularly readily accessible. In particular there may be mentioned, for example:

(4,4'-dihydroxy-dicyclohexyl)-methane,
1,1-(4,4'-dihydroxy-dicyclohexyl)-ethane,
1,1-(4,4'-dihydroxy-dicyclohexyl)-propane,
1,1-(4,4'-dihydroxy-dicyclohexyl)-butane,
1,1-(4,4'-dihydroxy-dicyclohexyl)-2-methyl-propane,
1,1-(4,4'-dihydroxy-dicyclohexyl)-heptane,
(4,4'-dihydroxy-dicyclohexyl)-cyclohexyl-methane,
(4,4' - dihydroxy - dicyclohexyl) - (4 - methyl - cyclohexyl)-methane,
(4,4' - dihydroxy - dicyclohexyl) - (4 - ethyl - cyclohexyl)-methane,
(4,4' - dihydroxy - dicyclohexyl) - (4 - isopropyl - cyclohexyl)-methane,
(4,4' - dihydroxy - dicyclohexyl) - (4 - butyl - cyclohexyl)-methane,
1,1-(4,4'-dihydroxy-dicyclohexyl)-2-cyclohexyl-ethane,
(4,4' - dihydroxy - dicyclohexyl) - α - tetrahydrofurylmethane,
2,2-(4,4'-dihydroxy-dicyclohexyl)-propane,
2,2-(4,4'-dihydroxy-dicyclohexyl)-butane,
2,2-(4,4'-dihydroxy-dicyclohexyl)-pentane,
2,2-(4,4'-dihydroxy-dicyclohexyl)-4-methyl-pentane,
2,2-(4,4'-dihydroxy-dicyclohexyl)-heptane,
2,2-(4,4'-dihydroxy-dicyclohexyl)-octane,
2,2-(4,4'-dihydroxy-dicyclohexyl)-nonane,
1,1 - (4,4' - dihydroxy - dicyclohexyl) - 1 - cyclohexylethane,
1,1 - (4,4' - dihydroxy - dicyclohexyl) - 1 - (α - tetrahydrofuryl)-ethane,
3,3-(4,4'-dihydroxy-dicyclohexyl)-pentane,
4,4-(4,4'-dihydroxy-dicyclohexyl)-heptane,
1,1-(4,4'-dihydroxy-dicyclohexyl)-cyclopentane,
1,1-(4,4'-dihydroxy-dicyclohexyl)-cyclohexane,
2,2 - (4,4' - dihydroxy - dicyclohexyl) - dekahydronaphthalene,
2,2 - (4,4' - dihydroxy - 3,3 - dicyclohexyl - dicyclohexyl)-propane,
2,2-(4,4'-dihydroxy-3-methyl-dicyclohexyl)-propane,
2,2 - (4,4' - dihydroxy - 3 - isopropyl - dicyclohexyl)-butane,
1,1 - (4,4' - dihydroxy - 3,3' - dimethyl - dicyclohexyl)-cyclohexane,
2,2 - (4,4' - dihydroxy - 3,3' - dibutyl - dicyclohexyl)-propane,
2,2 - (4,4' - dihydroxy - 3,3' - dicyclohexyl - cyclohexyl)-propane,
2,2 - (4,4' - dihydroxy - 2,2' - dimethyl - dicyclohexyl)-propane,
1,1 - (4,4' - dihydroxy - 3,3' - dimethyl -6,6' - dibutyl-dicyclohexyl)-butane,
1,1 - (4,4' - dihydroxy - 3,3' - dimethyl - 6,6' - di-tert.butyldicyclohexyl)-ethane,
1,1 - (4,4' - dihydroxy - 3,3' - dimethyl - 6,6' - di-tert.butyl-dicyclohexyl)-propane,
1,1 - (4,4' - dihydroxy - 3,3' - dimethyl - 6,6' - di-tert.butyl-dicyclohexyl)-butane,
1,1 - (4,4' - dihydroxy - 3,3' - dimethyl - 6,6' - di-tert.butyl-dicyclohexyl)-isobutane,
1,1 - (4,4' - dihydroxy - 3,3' - dimethyl - 6,6' - di-tert.butyl dicyclohexyl)-heptane,
1,1 - (4,4' - dihydroxy - 3,3' - dimethyl - 6,6' - di-tert.butyl-dicyclohexyl)-1-cyclohexyl-methane and
1,1 - (4,4' - dihydroxy - 3,3' - dimethyl - 6,6' - di-tert.amyl-dicyclohexyl)-butane.

The technical bis-phenols chiefly contain isomers having hydroxy groups in p-position, in addition to smaller quantities of 2,2'- and 2,4'-isomers. The hydrogenation products of these bis-phenols obtained as mixtures of geometrical isomers may be used as such, but the high melting isomers may also be satisfactorily used alone.

The unsaturated polyesters may also contain residues of other alcohol components in addition to the (hydroxy-dicyclohexyl)alkanes. Such other alcohol components are particularly dihydroxy aliphatic, cycloaliphatic or araliphatic compounds, for instance: ethylene glycol, di-ethylene glycol, tri-ethylene glycol, tetra-ethylene glycol, 1,2-propanediol, 1,3-propanediol, 1,2-butanediol, 1,3-butanediol, 2,3-butanediol, 1,4-butanediol, 1,4-butenediol, the pentanediols, the hexanediols, the heptanediols, the octanediols, octadecamethylene glycol, dihydroxy-cyclopentane, dihydroxy-cyclohexane and the xylylene glycols. Such alcohol components may be used up to such amounts that the polyesters still contain at least 20 percent of residues of (dihydroxy-dicyclohexyl)-alkanes.

Typical α-β-unsaturated dicarboxylic acids which may be used for preparing the unsaturated polyesters according to the invention are for example: The fumaric, the maleic, the itaconic and the citraconic acid.

Additionally to those unsaturated dicarboxylic acids saturated dicarboxylic acids may also be used. Among such saturated dicarboxylic acids we mention for instance: succinic acid, methyl-succinic acid, glutaric acid, adipic acid, methyl-adipic acid, pimelic acid, suberic acid, azelaic acid, sebacic acid, phthalic acid, isophthalic acid, terephthalic acid, tetra-chloro-phthalic acid, naphthalic acid, camphoric acid, diphenic acid and the diene addition products of α,β-unsaturated acids with terpenes, cyclopentadiene, hexachloro-cyclopentadiene, dicyclopentadiene, rosin and other similar diene addition compounds. Such saturated dicarboxylic acids may be used up to such amounts that the polyesters still contain at least 10 percent of residues of unsaturated dicarboxylic acids.

The preparation of the unsaturated polyesters is carried out in usual manner by condensation of the dicarboxylic acids or their anhydrides, with the alcohols, for example in the melt. The polyesters, while still liquid, are expediently treated with small quantities of a stabilizer such as hydroquinone or tert.butylpyrocatechol thereby improving the keeping quality of the polyesters which are subsequently mixed with the polymerizable ethylene derivatives.

The technical effect produced by the new process especially occurs with hardenable mixtures containing an aromatic vinyl compound such as styrene as copolymerizing component. Instead of styrene other suitable ethylene derivatives are for instance: 1-, 2-, or 3-methyl- or ethyl-styrene, in the nucleus chlorinated styrenes, divinyl-benzene, methyl-, ethyl- and butylacrylate and methacrylate, acrylic and methacrylic acid-ethyleneglycol-bis-ester, acryl nitrile, acrylic acid amide, N-cyclohexylacrylic acid amide, vinyl acetate, adipic acid divinylester, di-allyl-adipinate, di-allyl-phthalate, tri-allyl-phosphate and tri-allyl-cyanurate.

Such polymerizable ethylene derivatives may be used in such amounts as it is known for preparing hardenable mixtures of unsaturated polyesters.

Suitable polymerizing catalysts which have to be added to the hardenable mixtures are for instance: benzoylperoxide, methyl-ethylketone-peroxide, 1-hydroxy-1'-hydroperoxy-di-cyclohexyl-peroxide, tetra- and deca-hydroperoxy-naphthalene-hydro-peroxide, cumene hydroperoxide and azo-iso-butyric acid nitrile.

The mixtures according to the invention produced by copolymerisation with the aid of the above mentioned catalysts but without application of external heat, i. e. by cold hardening yield products whose surface exposed to air are very hard and do not, for example, show lasting finger prints. This renders the production of satisfactorily adhering air-drying lacquers possible, which differ from lacquers based on other unsaturated polyesters by a substantially improved polishing capability. The lacquers may also be pigmented and, if desired, blended with unpolymerizing solvents such as ethyl acetate. The new mixture may also generally be applied with advantage in those cases in which the hardening is not carried out in closed moulds; for example, as pourable sealing or filling material or as castings. If desired, the appropriately catalysed mixtures may also be hardened by heating and serve for example in the production of stoving lacquers.

The following examples are given for the purpose of illustrating the invention, the parts being parts by weight.

*Example 1*

294 parts of maleic anhydride, 1036 parts of phthalic anhydride, 450 parts of 1,3-butylene glycol and 1200 parts of 2,2-(4,4'-dihydroxy-dicyclohexyl)-propane (a mixture of geometrical isomers) are esterified in a vessel provided with an agitator at a temperature rising slowly to 200° C. with introduction of nitrogen, until an acid number of 21 is attained. 140 parts of a 55 percent styrene solution of the unsaturated polyester thus obtained are treated with 2.8 parts of 1-hydroxy-1'-hydroperoxy-dicyclohexyl peroxide, and shortly before working up, with 0.8 parts of a 20 percent toluene solution of cobalt naphthenate. A coat of the clear lacquer thus obtained dries within 2–4 hours at room temperature to a tack-free film exhibiting a good hardness and mechanical resistance after 24 hours. The same film properties are obtained after 3 hours when the drying is performed at 50° C.

A clear lacquer obtained in a similar manner from an unsaturated polyester the composition of which corresponds to that mentioned above but with the exception that bis-(hydroxy-cyclohexyl)-propane is replaced by an equimolar amount of additional 1,3-butyleneglycol does not yield a tack-free surface even after several days of air-drying.

*Example 2*

An unsaturated polyester is prepared by the process described in Example 1, from 392 parts of maleic anhydride, 888 parts of phthalic anhydride, 186 parts of ethylene glycol, 180 parts of 1,3-butyleneglycol and 1200 parts of 2,2-(4,4'-dihydroxy-dicyclohexyl)-propane which has been freed from low melting geometrical isomers by recrystallization from methanol and washing out with acetone, and has a melting point of 180° C. Into the polyester thus obtained of acid number 23, there are stirred 0.27 part of hydroquinone at melting temperature. A clear lacquer consisting of a 55 percent solution of the polyester in styrene is mixed with 2 percent by weight of 1-hydroxy-1'-hydroperoxy-dicyclohexyl peroxide and 0.6 percent by weight of a 20 percent toluene solution of cobalt naphthenate diluted with ethylacetate to spraying consistency and then applied to a wooden plate with a spray gun. The satisfactorily flowing clear lacquer concealing all unevenness of the wood dries at room temperature within 3–5 hours to a colourless transparent film. The film shows an excellent hardness after 24 hours as well as a good adhesiveness and elasticity, withstanding considerable changes of temperature. Thus no cracking occurs when the film is exposed twenty times over for an hour each at a temperature of plus 50° C., and for an hour each at minus 15° C.

*Example 3*

A filling material is made up from the unsaturated polyester described in Example 2 as follows:

75 parts of unsaturated polyester
65 parts of styrene
60 parts of calcium carbonate
35 parts of barium sulphate
5 parts of titanium dioxide
2 parts of a 50 percent toluene solution of a short oil ricinenic alkyd resin 2.8 parts of 1-hydroxy-1'-hydroperoxy-dicyclohexyl-peroxide, dissolved in
25 parts of ethyl acetate After stirring into it 0.8 part of a 20 percent toluene solution of cobalt naphthenate, the mixture is sprayed onto a wooden surface. The filling material dries tack-free within 2–4 hours and can be satisfactorily polished after 24 hours.

*Example 4*

A mixture consisting of equal parts of styrene and an unsaturated polyester of acid number 25, prepared according to the instruction of Example 1, from 392 parts of maleic anhydride, 888 parts of phthalic anhydride, 260 parts of ethylene glycol, 212 parts of diethylene glycol and 960 parts of 2,2-(4,4'-dihydroxy-dicyclohexyl)-propane and stabilized with 0.01 percent of hydroquinone) with 2 percent by weight of 1-hydroxy-1'-hydroperoxy-dicyclohexyl peroxide, is treated shortly before being used, with 0.4 percent by weight of a 20 percent cobalt naphthenate solution and poured into an open glass mould and containing an insert to be embedded. The mixture solidifies after about 20 minutes and polymerizes through within 3–4 hours into a hard, glass-clear body the air-exposed surface of which is hard and tack-free as the other surface surrounded by the mould.

*Example 5*

580 parts of maleic acid, 740 parts of phthalic anhydride, 250 parts of ethylene glycol, 180 parts of 1,3-butylene glycol and 1120 parts of 1,1-(4,4'-dihydroxy-dicyclohexyl)-cyclohexane are esterified to form an unsaturated polyester of acid number 20 in a vessel fitted with an agitator at a temperature rising slowly to 180° C. with introduction of nitrogen. A 50 percent solution of this unsaturated polyester in styrene is mixed with 4 percent by weight of a paste consisting of equal parts of 1-hydroxy-1'-hydroperoxy-dicyclohexyl-peroxide and dibutyl phthalate as well as of 0.5 percent by weight of a 20 percent solution of cobalt naphthenate in toluene and applied as a thick layer to a de-rusted iron sheet. The polymerization, starting soon at a temperature of 25° C., yields a coat of good adhesiveness whose surface and deeper layers dry well. After 2–3 hours it is tack-free; after 24 hours it does not show any lasting finger prints.

*Example 6*

A mixture of 882 parts of maleic anhydride, 148 parts of phthalic anhydride, 419 parts of ethylene glycol, 212 parts of diethylene glycol and 480 parts of 2,2-(4,4'-dihydroxy-dicyclohexyl)-propane is heated to 180° C. for up to 2 hours, while stirring, and passing a gentle current of nitrogen. The separated water is distilled off. After 3 hours heating at 180° C., the major part of the water has come over and the acid number has fallen to 75. The distillation column is now removed and esterification proceeds with the addition of 0.2 gm. hydroquinone and gradual increase of temperature to 200° C. and gradual strengthening of the nitrogen stream, until an acid number of 21 is reached. After cooling to 160° C., a further 0.2 gm. hydroquinone is stirred in. When the temperature has fallen to 130° C., 840 parts of styrene are added and stirring continued as the mixture cools, until complete dissolution is obtained.

From the polyester-styrene solution thus obtained, there may be produced mouldings and laminated glass-fibre fabrics with outstanding heat resistance. Mixed with 2 parts percent of benzoyl peroxide, an unfilled solution hardens after moulding by heating for 4 hours at 75° C. to a glass clear body, which, after annealing for eight hours at 110° C. shows the following properties:

| | |
|---|---|
| Impact strength | 3.3 cm. kg./cm.$^2$ |
| Bending resistance | 1000 kg./cm.$^2$ |
| Brinell hardness | 10 secs. 1460 |
| Heat resistance (Martens) | 114° C. |

In association with glass fibre, an even better heat resistance of over 200 (Martens degrees) is attained.

We claim:

1. A hardenable mixture comprising a polymerizable monomeric ethylene derivative and an unsaturated polyester resin derived from the polycondensation of at least one dihydric alcohol with at least one dicarboxylic acid, at least 20% by weight of the dihydric alcohol radical content of said unsaturated polyester resin being derived from a dihydroxy-dicyclohexylalkane and at least 10% by weight of the dicarboxylic acid radical content of said unsaturated polyester resin being derived from an α,β-ethylenically unsaturated dicarboxylic acid.

2. A hardenable mixture as defined in claim 1 wherein the unsaturated polyester includes a chain linking radical component of a dihydroxy compound selected from the group consisting of dihydroxy aliphatic, cycloaliphatic and araliphatic compounds.

3. A hardenable mixture as defined in claim 1 wherein said dihydroxy-dicyclohexyl-alkane is 2,2-(4,4'-dihydroxy-dicyclohexyl)-propane.

4. A hardenable mixture as defined in claim 1 wherein said dihydroxy-dicyclohexyl-alkane is 1,1-(4,4'-dihydroxy-dicyclohexyl)-cyclohexane.

5. A hardenable mixture as defined in claim 1 wherein said polymerizable monomeric ethylene derivative is styrene.

6. An unsaturated polyester resin suitable for polymerization with a monomeric ethylene derivative for producing a hardenable mixture, said unsaturated polyester resin being derived from a polycondensation of at least one dihydric alcohol with at least one unsaturated dicarboxylic acid, at least 20% by weight of the dihydric alcohol radical content of said unsaturated polyester resin being derived from a dihydroxy-dicyclohexyl-alkane and at least 10% by weight of the dicarboxylic acid radical content of said unsaturated polyester resin being derived from an α,β-ethylenically unsaturated dicarboxylic acid.

7. An unsaturated polyester resin as defined in claim 6 including a chain linking radical component of a dihydroxy compound selected from the group consisting of dihydroxy aliphatic, cycloaliphatic and araliphatic compounds.

8. An unsaturated polyester resin as defined in claim 6 wherein said dihydroxy-dicyclohexyl-alkane is 2,2-(4,4'-dihydroxy-dicyclohexyl)-propane.

9. An unsaturated polyester resin as defined in claim 6 wherein said dihydroxy-dicyclohexyl-alkane is 1,1-(4,4'-dihydroxy-dicyclohexyl)-cyclohexane.

10. An unsaturated polyester resin as defined in claim 6 wherein said polymerizable monomeric ethylene derivative is styrene.

11. The process of producing a polymerized composition having a hard, tack-free surface, even when polymerized at room temperature in the presence of air, which comprises admixing a cross-linking amount of a polymerizable monomeric ethylene derivative with an unsaturated polyester resin derived from the polycondensation of at least one dihydric alcohol with a dicarboxylic acid, at least 20% by weight of the dihydric alcohol radical content of said unsaturated polyester resin being derived from a dihydroxy-dicyclohexyl-alkane and at least 10% by weight of the dicarboxylic acid radical content of said unsaturated polyester being derived from an α,β-ethylenically unsaturated dicarboxylic acid and curing said mixture.

References Cited in the file of this patent

UNITED STATES PATENTS

| | | |
|---|---|---|
| 2,118,954 | Thomas | May 31, 1938 |
| 2,742,445 | Lum | Apr. 17, 1956 |